(12) United States Patent
Green et al.

(10) Patent No.: US 8,423,459 B1
(45) Date of Patent: Apr. 16, 2013

(54) PRIORITIZING POTENTIAL TRANSACTION COUNTER-PARTIES WITH SOCIAL NETWORK CONTENT

(75) Inventors: Travis Harrison Kroll Green, New York, NY (US); Narelle Cozens, New York, NY (US); Avery Pennarun, New York, NY (US); Peter Schmitt, Jersey City, NJ (US); Michael DePasquale, Rutherford, NJ (US); Boris Mizhen, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/436,817

(22) Filed: Mar. 30, 2012

(51) Int. Cl.
*G06Q 40/00* (2012.01)
(52) U.S. Cl.
USPC .......................................................... 705/39
(58) Field of Classification Search ...................... 705/39
See application file for complete search history.

(56) References Cited

U.S. PATENT DOCUMENTS

| | | | |
|---|---|---|---|
| 7,174,382 B2* | 2/2007 | Ramanathan et al. | 709/227 |
| 2010/0069058 A1* | 3/2010 | Rothschild | 455/422.1 |
| 2011/0099274 A1* | 4/2011 | Puthenkulam et al. | 709/224 |
| 2012/0150734 A1* | 6/2012 | Bangah et al. | 705/39 |

* cited by examiner

*Primary Examiner* — Daniel Felten
*Assistant Examiner* — Clifford Madamba
(74) *Attorney, Agent, or Firm* — Johnson, Marcou & Isaacs, LLC (57) ABSTRACT

A user installs a Peer-to-Peer Payment Application ("PPA") on their mobile device. The PPA transmits the location of the user device to a server located in a Peer-to-Peer Payment System ("PPS"). The PPS may search for other devices within a certain proximity to the user that may be active. The PPS may search the social network content of the user to determine if any of the proximate devices users are likely counter-parties. If more than one likely counter-party is identified, the PPS may rank the counter-parties according to a preconfigured set of factors that define the strength of the connection to the user. These factors may include their status in the user's social networks, frequency of contact, prior transactions, or other factors that further establish a relationship. The PPS may transmit the ranked list of likely counter-parties to the PPA for display to the user on the device.

22 Claims, 2 Drawing Sheets

PRIORITIZING POTENTIAL TRANSACTION COUNTER-PARTIES WITH SOCIAL NETWORK CONTENT

TECHNICAL FIELD

The present disclosure relates generally to peer-to-peer transactions, and more particularly to a method for using social networking content and location data of a user to identify likely transaction counter-parties.

BACKGROUND

Users of smartphones and other similar devices are conducting an increasing number of electronic transactions using such devices. While financial transactions with merchants have become more user-friendly and commonplace, users are additionally employing their devices to conduct transactions with other mobile device users. These types of peer-to-peer transactions often require an overwhelming amount of data input to identify the other party in the transaction and to conduct the transaction.

Users of this technology are desirous of a simpler and faster method of locating the account of a transaction counter-party. An example of a circumstance in which users may conduct this type of peer-to-peer transaction is when multiple parties are paying a bill while dining at a restaurant. If one person pays the restaurant for the bill of a group of diners and the other members of the party would like to pay that person their share of the bill, entering account information of the payee by every member of the party would be burdensome.

Conventional systems do not present a list of likely counter-parties that are available to conduct the transaction. Additionally, such systems do not present a rank or order of the most likely counter-parties.

Thus, a need in the art exists for systems and methods that improve upon one or more of the above-described limitations.

SUMMARY

An aspect of the present invention provides a computer-implemented method for using the social networking content and the location data of a user to present likely transaction counter-parties. A user installs a Peer-to-Peer Payment Application ("PPA") on their mobile device. The PPA employs the location technology of the user device to transmit the location of the device, and thus the location of the user. The location can be transmitted to a server located in a Peer-to-Peer Payment System ("PPS"). By establishing the location of the user, the PPS may search for other devices within a certain proximity to the user that may be active. The PPS may search the social network content of the user to determine if any of the proximate devices users are likely counter-parties. If more than one likely counter-party is identified, the PPS may rank the counter-parties according to a preconfigured set of factors that define the strength of the connection to the user. These factors may include their status in the user's social networks, frequency of contact, prior transactions, or other factors that further establish a relationship. The PPS may transmit the ranked list of likely counter-parties to the PPA for display to the user on the device. The user may select a contact from the list to be the counter-party for the current transaction.

Another aspect of the present invention provides a computer program product that is installed on a user's device and on a server located in a PPS for using the social networking content and the location data of a user to present likely transaction counter-parties. The computer program product includes a non-transitory computer-readable storage device having computer-readable program instructions stored therein. The computer-readable program instructions include computer program instructions for transmitting the user's location from the user device to the PPS server; locating other active devices in the proximity of the user; ranking the other devices according their likelihood as counter-parties to the transaction based on the strength of the connection to the user; transmitting the list to a PPA; displaying the likely counter-party list to the user for selection; and consummating the transaction.

Another aspect of the present invention provides an apparatus for using the social networking content and the location data of a user to present likely transaction counter-parties. The apparatus includes a PPA that can communicate with the PPS. The PPA is configured for transmitting the user's location to the PPS server; displaying to the user a list of likely transaction counter-parties; and conducting the transaction. The apparatus includes a PPS server configured for receiving the location data; locating other active devices in the proximity of the user; ranking the other devices according their likelihood as counter-parties to the transaction based on the strength of the connection to the user; and transmitting the list to a PPA.

These and other aspects, objects, features, and advantages of the exemplary embodiments will become apparent to those having ordinary skill in the art upon consideration of the following detailed description of illustrated exemplary embodiments, which include the best mode of carrying out the invention as presently presented.

DETAILED DESCRIPTION OF THE EXEMPLARY EMBODIMENTS

Overview

The exemplary embodiments provide a Peer-to-Peer Payment Application ("PPA") that can employ a user's social graph and location data for identifying likely counter-parties for a peer-to-peer transaction with a mobile device. The social graph of a user refers to all of a user's contacts, friends, family, and other members of a user's online network. The social graph not only determines the members of a user's network, but also determines how the members are related and how closely the members are related.

A user installs a PPA on their mobile device. The PPA can provide a user interface for entering configuration information. The PPA employs the Global Positioning System ("GPS") location technology or other location identifying technology of the user device to transmit the location of the device, and thus the location of the user. This location can be transmitted to a server located in a Peer-to-Peer Payment System ("PPS"). The PPA might gather the location data directly from the phone or the PPA might request the location from another location-based application operating on the phone. Additionally or alternatively, the PPA can determine the location of the user device from a device supplying a Wi-Fi connection.

The PPS searches for other mobile devices operating in a predetermined proximity of the user. The proximity threshold may be configured by the user or the PPS. The proximity threshold may further be variable based upon factors predetermined by the user or the PPS. For example, the PPS may vary the proximity based on the density of the users identified or the quantity of social network data available from the user's accounts. The PPS may first gather the location data and identity of other users that have accounts on the PPS. Additionally or alternatively, the PPS may be configured to communicate with other location based programs or applications that can supply location data and user identity to the PPS server.

The PPS compares the list of proximate user identities with a compilation of social network data from the user. From the social network data, the PPS searches the identities of the user's contacts, friends, business associates, family members or any other identities that can be extracted. The PPS may additionally rank the identities based on a set of criteria configured to supply the most likely counter-party to the user's transaction.

The PPS may gather the identities from any social network data available from the user's online activities. Examples of locations available from which the PPS may gather data may include, but not be limited to, social network websites accounts such as on FACEBOOK or GOOGLE+, contact list entries, email contacts, or other programs and applications running on user devices. One of the criteria used by the PPS to rank the results may be based on the status of the contact on the social network status, such as a "friend" on FACEBOOK or a friend of a friend. If a friend is on the ranking list, then the friends of that friend may be included on the list and given a certain priority. Other criteria may include, but would not be limited to, frequency of emails or texts with a contact, physical distance from user based on the location data, previous transactions with the user, or recent activation of the PPS application on the device.

After generating a ranked list of likely counter-parties, the PPS transmits the list to the PPA on the user device. The user may easily select the name and account from the user interface and proceed with the transaction.

The PPA can be embodied as a stand-alone application program or as a companion program to a web browser, for example, as a companion program to a Hypertext Markup Language revision 5 ("HTML5") compliant web browser or other type of web browser having messaging and storage capabilities. While certain embodiments are described in which parts of the PPA are implemented in software, it will be appreciated that one or more acts or functions of the PPA may be performed by hardware, software, or a combination thereof, as may be embodied in one or more computing systems.

The functionality of the exemplary embodiments will be explained in more detail in the following description, read in conjunction with the figures illustrating the program flow.

System Architecture

Turning now to the drawings, in which like numerals represent like (but not necessarily identical) elements throughout the figures, exemplary embodiments of the present invention are described in detail.

Figure 1:
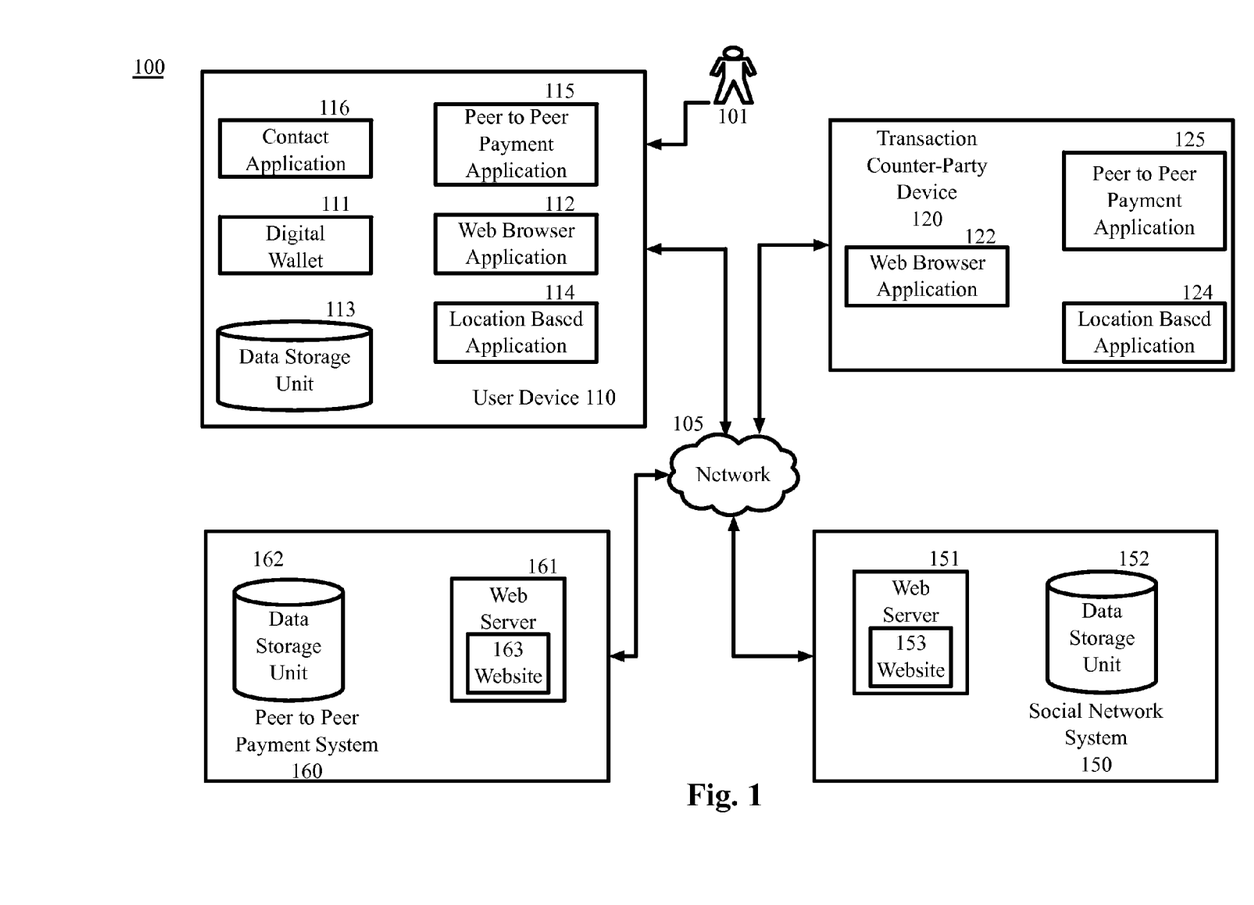
FIG. 1 is a block diagram depicting a system for using social network content and location data to identify likely counter-parties for a peer-to-peer transaction with a mobile device, in accordance with certain exemplary embodiments.

FIG. 1 is a block diagram depicting a system for using social network content and location data to identify likely counter-parties for a peer-to-peer transaction with a mobile device, in accordance with certain exemplary embodiments.

As depicted in FIG. 1, the system 100 includes network devices 110, 120, 150 and 160 that are configured to communicate with one another via one or more networks 105.

Each network 105 includes a wired or wireless telecommunication means by which network devices (including devices 110, 120, 150, 160) can exchange data. For example, each network 105 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 110, 120, 150 and 160 includes a device having a communication module capable of transmitting and receiving data over the network 105. For example, each network device 110, 120, 150 and 160 can include a server, desktop computer, laptop computer, tablet computer, smart phone, handheld computer, personal digital assistant ("PDA"), or any other wired or wireless, processor-driven device. In the exemplary embodiment depicted in FIG. 1, the network devices 110, 120, 150 and 160 are operated by end-users or consumers, likely transaction counter-party users, publishers of social network system, and a peer-to-peer payment system operator, respectively.

The user 101 can use the application 112, such as a web browser application or a stand-alone application, to view, download, upload, or otherwise access documents or web pages via a distributed network 105. The network 105 includes a wired or wireless telecommunication system or device by which network devices (including devices 110, 120, 150, and 160) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of exemplary embodiments, it should be understood that the terms "data" and "information" are used interchangeably herein to refer to text, images, audio, video, or any other form of information that can exist in a computer based environment.

The web browser application 112 can interact with web servers (or other computing devices) connected to the network 105, transaction counter-parties 125, web server 151 of the Social Network System 150, and the web server 161 of the PPS 160.

The user device 110 may include a digital wallet application module 111. The digital wallet 111 may encompass any application, hardware, software, or process the user device 110 may employ to assist the device to complete a purchase transaction. The digital wallet 111 can be separate from, can interact with, or can be embodied as a companion application of the web browser application 112. As a companion application, the digital wallet 111 executes within the web browser application 112. That is, the digital wallet 111 may be an application program embedded in the web browser application 112. If the digital wallet 111 is separate from the web browser application 112, the digital wallet can access the network 105 and the Internet via any available communication technologies.

The user device 110 may include a PPA 115. The PPA 115 can interact with the web browser application 112 or be embodied as a companion application of the web browser application 112 and execute within the web browser application 112. The PPA 115 may further be embodied as a companion application of the digital wallet 111 and execute within the digital wallet 111. The PPA 115 may employ a software interface that may open in the digital wallet application 111 or may open in the web browser application 112. The interface can allow the user 101 to configure the PPA 115 and the user account on the PPS 160.

The PPA 115 can be used to send device location data to the PPS 160 and receive a likely transaction counter-party list from the PPS 160. The PPS 160 that develops the list and prosecutes the transaction can include a set of computer-readable program instructions, for example, using JavaScript, that enable the PPS 160 to interact with the PPA 115.

The user device 110 includes a data storage unit 113 accessible by the PPA 115 and the web browser application 112. The exemplary data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The user device 110 may include a location based application 114 that the PPA 115 or the PPS 160 may utilize to access location data for the user device 110. Examples of applications that may utilize the location data, and thus may make it available to the PPS 160, may include, but would not be limited to, business finder applications such as AROUNDME, location based social networks such as FOURSQUARE, location based gaming such as GOWALLA, or friend locater applications such as GOOGLE LATTITUDE.

The user device 110 may include one or more contact applications 116. A contact application 116 may be any program or application on the user device 110 that maintains a list of contacts of the user that the PPS 160 may access. Examples of contact applications 116 might include, but not be limited to, email applications, text applications, instant messaging, calendar invite lists, or contact databases such as OUTLOOK or ACT. The contacts from a contact application 116 may be prioritized by factors such as frequency of communication with user 101, the number of contact applications on which a particular contact appears, or any other prioritizing factors which may be extracted from the applications.

The PPS 160 utilizes a PPS server 161. The PPS server 161 may represent the computer implemented system that the PPS 160 employs to configure user accounts, create and maintain user profiles, collect the location data, communicate with the social network system 150, develop likely transaction counter-part lists, submit the list to the user 101, and conduct the transaction. The PPS website 163 may represent any web-based interface that allows users to interact with the PPS 160 to configure the user accounts and change account settings. The PPS server 161 can communicate with one or more social network systems 150, one or more transaction counter-party devices 120, and a user device 110 via any available technologies. These technologies may include, but would not be limited to, an Internet connection via the network 105, email, text, instant messaging, or other suitable communication technologies. The PPS 160 may include a data storage unit 162 accessible by the server 161 of the PPS 160. The data storage unit 162 can include one or more tangible computer-readable storage devices.

The social network system 150 utilizes a social network system server 151. The social network server 151 may represent the computer-implemented system that the social network system 150 employs to host the social network website 153 and all of the profiles and communities that use the social network website 153. The social network website 153 may represent any web-based community that allows users to interact over the Internet with others who typically share a common interest. Examples of the social network websites 153 that the user 101 may belong to or interact with may include, but would not be limited to, FACEBOOK, GOOGLE+, or LINKEDIN.

The social network system 150 may provide the PPS 160 with a list of members of the user's online community. The social network system 150 may prioritize the relationship of each member of the community with the user 101. This may be determined by factors that may apply to the structure of each particular social network system 150. For example, a social network system such as FACEBOOK may categorize members of the community as "friends" or "friends of friends" and LINKEDIN may categorize members as first, second, or third degree contacts.

The social network system server 151 can communicate with a PPS 160 and user devices 110 via any available technologies. These technologies may include, but would not be limited to, an Internet connection via the network 105, email, text, instant messaging, or other suitable communication technologies. The social network system 150 may include a data storage unit 152 accessible by the server 151 of the social network system 150. The data storage unit 152 can include one or more tangible computer-readable storage devices.

The transaction counter-party device 120 may represent the devices with which the user 101 may conduct a peer-to-peer transaction. Like the user device 110, the transaction counter-party device 120 may be a mobile device, (for example, notebook computer, tablet computer, netbook computer, personal digital assistant (PDA), video game device, GPS locator device, cellular telephone, smartphone, or other mobile device), or other appropriate technology that includes or is coupled to a web browser application module 112, such as GOOGLE'S CHROME, MICROSOFT'S INTERNET EXPLORER, or MOZILLA'S FIREFOX.

The transaction counter-party device 120 may include a Peer-to-Peer Payment Application ("PPA") 125, a counterpart to PPA 115, or a compatible transaction application that will allow transactions with the user device 110. The transaction counter-party device 120 may include a location based application 124 that the PPA 125 or the PPS 160 may utilize to access location data for the transaction counter-party device 120 or the PPA 125 may extract location data directly from the transaction counter-party device 120. The location based application 124 may be similar, or compatible with, the location based application 114 operating on the user device 110.

It will be appreciated that the network connections shown are exemplary and other means of establishing a communications link between the computers and devices can be used. Moreover, those having ordinary skill in the art having the benefit of the present disclosure will appreciate that the user device 110, transaction counter-party device 120, social network system 150, and PPS 160 illustrated in FIG. 1 can have any of several other suitable computer system configurations. For example, a user device 110 embodied as a mobile phone or handheld computer may not include all the components described above.

System Process

The components of the exemplary operating environment 100 are described hereinafter with reference to the exemplary methods illustrated in FIG. 2. The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, a skilled programmer would be able to write such computer programs to implement exemplary embodiments based on the flow charts and associated description in the application text. Therefore, disclosure of a particular set of program code instructions is not considered necessary for an adequate understanding of how to make and use the exemplary embodiments. Further, those skilled in the art will appreciate that one or more acts described may be performed by hardware, software, or a combination thereof, as may be embodied in one or more computing systems.

Figure 2:
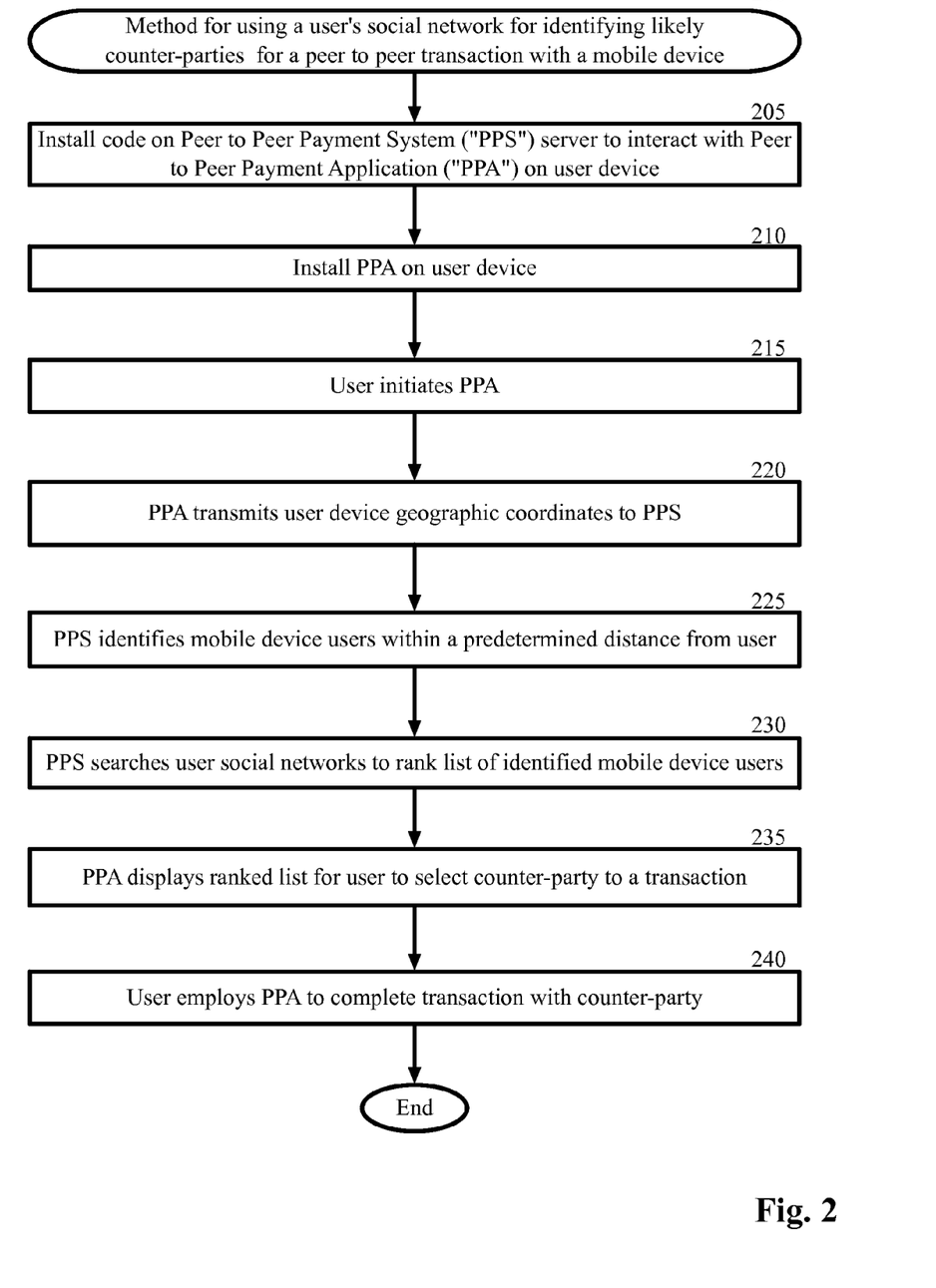
FIG. 2 is a block flow diagram depicting a method for using social network content and location data to identify likely counter-parties for a peer-to-peer transaction with a mobile device, in accordance with certain exemplary embodiments.

FIG. 2 is a flow chart depicting a method 200 for using location data and social network content of a user to identify likely counter-parties for a peer-to-peer transaction with a mobile device, in accordance with certain exemplary embodiments.

With reference to FIGS. 1 and 2, in block 205, the Peer-to-Peer Payment System ("PPS") 160 installs computer-readable program instructions on the PPS server 161 for interacting with the Peer-to-Peer Payment Application ("PPA") 115 on the user device 110. Additionally, the PPS 160 installs computer-readable program instructions on the PPS server 161 for interacting with the Social Network System 150. In an exemplary embodiment, these computer-readable program instructions may be implemented as an embedded script, such as JavaScript, in the PPS server 161.

In block 210, the user 101 installs a PPA 115 on the user device 110. In certain exemplary embodiments, the user 101 may navigate to a website of a provider of the PPA 115 and download and install the PPA 115. The website that provides the PPA 115 may be the PPS website 153. The PPA 115 may be embedded in a digital wallet 112 on a user device 110. The user 101 may utilize a user interface of the PPA 115 to configure the PPA 115. The user 101 may configure privacy settings provided by the PPA 115. Additionally, the user 101 may communicate with the computer-readable program instructions on the PPS 160 to establish user identification and transaction configuration. Other configuration settings might include identifying certain transaction counter-parties as preferred, blocking certain transaction counter-parties, bookmarking certain transaction counter-parties, or other preferences. The communication with the PPS 160 may be made via any available technology including, but not limited to, an Internet connection via the network 105, text, email, or a cellular connection.

In block 215, the user 101 initiates the PPA 115 by actuating a physical or virtual button, making a motion such as a "tap" or swipe with the user device 110, speaking a voice command, or performing any other initiation process.

In block 225, the PPA 115 transmits to the PPS 150 the location of the user device 110. The PPA 115 may be configured to access the location data directly from the user device 110. The user device 110 may have the capability, through computer hardware or software, or a combination thereof, to determine the geographic coordinates of the location of the user device 110. For example, the user device 110 may utilize the Global Positioning System ("GPS") or a communication network location to determine its location.

Additionally or alternatively, the user device 110 may include a location-based application 114 that the PPA 115 or the PPS 160 may utilize to access location data for the user device 110. Examples of applications that may utilize the location data, and thus may make it available to the PPS 160, may include, but would not be limited to, business finder applications such as AROUNDME, location based social networks such as FOURSQUARE, location based gaming such as GOWALLA, or friend locater applications such as GOOGLE LATTITUDE.

In block 225, the PPS 160 receives the location data and stores it in the user profile created on the PPS server 161. The PPS 160 searches for other user devices that may be the desired transaction counter-party device 120 operating in a predetermined proximity of the user 101. The proximity threshold may be configured by the user 101 or the PPS 160. That is, the user 101 or the PPS 160 may be capable of configuring how far away another device may be and still be listed as a proximate user.

The proximity threshold may further be variable based upon factors predetermined by the user 101 or the PPS 160. For example, the PPS 160 may vary the proximity threshold based on the density of the devices 120 identified or the quantity of social network data available from the accounts of the user 101.

In certain exemplary embodiments of the invention, the PPS 160 may only gather the location data and identity of the users of the devices 120 that also have accounts on the PPS 160. Additionally or alternatively, the PPS 160 may be configured to communicate with other location based programs or applications, such as a compatible peer-to-peer payment application, that can supply location data and user identity to the PPS 160.

In certain exemplary embodiments, to limit the number of resulting identities, the PPS 160 may store only the identities of the potential transaction counter-parties that have recently activated a network device and/or a peer-to-peer transaction application that is compatible with the PPS 160. In alternate embodiments, the PPS 160 may store the identities of potential transaction counter-parties that have user devices 125 that are active or have been active within a configured time frame. Additionally or alternatively, the PPS 160 may require the potential transaction counter-parties to perform a specified action to indicate a request to be on a potential transaction counter-party list. For example, the counter-party may be required to indicate a request by actuating a physical or virtual button, making a motion such as a "tap" or swipe with the user device 110, speaking a voice command, or performing any other confirming action to configure the counter-party device 120 for a transaction.

In block 230, the PPS 160 compares the list of proximate user identities with the social graph of the user 101. The social graph of a user refers to all of a user's contacts, friends, family, and other members of a user's online network. The social graph not only determines the members of a user's network, but also determines how the members are related and how closely the members are related. The social graph can be compiled from the social networks of which the user is a member, email contacts, text contacts, frequent transaction parties, and other suitable sources.

From social network data, the PPS 160 searches the identities of the user's contacts, friends, business associates, family members, or any other identity that can be extracted from the data. Examples of the social network websites 153 to which the user 101 may belong may include, but would not be limited to, FACEBOOK, GOOGLE+, or LINKEDIN.

The social network system 150 may provide the PPS 160 with a list of contacts from the user's online community. The social network system 150 may further prioritize the relative strength of the connection between each contact from the community and the user. The priority may be determined by factors that may apply to the structure of each particular social network system 150. For example, a social network system such as FACEBOOK may categorize members of the community as "friends" or "friends of friends" and LINKEDIN may categorize members as first, second, or third degree contacts. GOOGLE+ may categorize members based on "circles," which can define the relationship with the user 101. Additionally, the PPS 160 can extract prioritizing data from a social network system 150 such as the number of times a contact commented on a post or status of the user 101, the number of times the contact and the user 101 have appeared in the same post, the number of times the contact and the user 101 have been identified in the same picture, and other suitable prioritizing data.

The PPS 160 may additionally or alternatively extract contacts from the contact applications 116 on a user device 110. A contact application 116 may be any program or application on the user device 110 that maintains a list of contacts of the user 101 that the PPS 160 may access. Examples of contact applications 116 might include, but not be limited to, email applications, text applications, instant messaging, calendar invite lists, or contact databases such as OUTLOOK or ACT. The potential transaction counter-parties from a contact application 116 may be prioritized by factors such as frequency of communication with user 101, the number of different contact applications 116 on which a particular contact appears, responses to emails, texts, instant messages, or posts between the counter party and the user 101, previous transactions, or any other prioritizing factors which may be extracted from the data.

Other priority factors may be used to determine the ranking of a contact. For example, if a contact has recently made a merchant transaction, the PPS 160 may promote that contact to a higher priority. An example of where this factor may be useful might be at a restaurant when one member of a party pays the bill and the other members of the party would like to pay the first member for their share of the bill. When the members of the party initiate a PPA 115, the PPS 160 may recognize the bill payment transaction and give the bill-paying contact a higher priority.

Another factor that may be considered to determine the ranking of the potential transaction counter-parties may be recent transactions by the device 120 using a PPA 125 or a compatible peer-to-peer application. For instance, if two potential transaction counter-parties have recently made a PPA 125 transaction, the sender of a payment might be demoted in the ranked list and the receiver might be promoted. In the previous example of a group at a restaurant, the PPS 160 might recognize that a potential counter-party just received a payment and infer that the user 101 might also want to make a payment to that counter-party.

Another ranking factor might be the number of prior transactions that the user 101 has had with the potential transaction counter-party. For example, a frequent transaction counter-party may receive a higher ranking and an infrequent counter-party may receive a lower ranking. In an exemplary embodiment, the ranking depends on the frequency of the transactions conducted with the PPA 115.

The PPS 160 creates a ranked list of potential transaction counter-parties from the identified contacts. The final ranking of the potential transaction counter-parties may be determined by a configured ranking system. For example, the ranking system may assign scores to a potential transaction counter-parties based upon each instance that they appear in the social network of the user 101. In certain exemplary embodiments, the PPS 160 applies the extracted data to a machine learning algorithm or another statistical model to determine the most effective ranking system. For example, a machine learning algorithm can be performed on the lists of one or more users to learn the ranking system that produces lists from which the users most often pick the higher ranked contacts. The algorithm may be updated with the previous behavior of the user 101 and the behavior of a global set of users. Examples of inputs with which the algorithm may be updated would include texting frequency, email frequency, how often the user and the counter-party are in the same place, previous payments, time of day, and other suitable data. The machine learning algorithm can be updated periodically.

In block 235, the PPS 160 transmits the ranked list of potential transaction counter-parties to the PPA 115. The PPA 115 displays the list to the user 101 for selection via the user interface of the PPA 115.

In block 240, the user 101 selects a contact from the list that is the desired transaction counter-party. The PPA 115 may proceed with the peer-to-peer transaction. For example, the user device 110 and the counter-party device 120 may communicate directly and/or with a payment server to conduct a payment transaction to transfer funds from the user 101 to a user associated with the counter-party device 120. The PPA 115 may automatically populate information to process the transaction from information associated with the identified and selected counter-party.

In an exemplary embodiment, the transaction may be a financial transaction and may employ any financial accounts the user 101 configures on the PPA 115 or in the digital wallet 111, such as a credit card payment, debit card payment, a bank transfer, or any other financial account transaction that might be conducted on the user device 110. The PPA 115 user interface may allow the user 101 to choose the financial account to be used and enter an amount to transfer to a chosen financial account of the counter-party.

In alternate embodiments of the invention, the transaction may be merely an exchange of information or other type of non-financial transaction. One skilled in the art might recognize that examples of such a transaction that might include, but would not be limited to, exchanging contact information, transferring event information such as a concert, transferring data files, transmitting directions, or any other transaction that might benefit from the present invention.

After completion of the transaction, the method 200 ends.

General

Users may be allowed to limit or otherwise affect the operation of the features disclosed herein. For example, users may be given opportunities to opt-in or opt-out of the collection or use of certain data or the activation of certain features. In addition, users may be given the opportunity to change the manner in which the features are employed, including for situations in which users may have concerns regarding privacy. Instructions also may be provided to users to notify them regarding policies about the use of information, including personally identifiable information, and manners in which each user may affect such use of information. Thus, information can be used to benefit a user, if desired, through receipt of relevant advertisements, offers, or other information, without risking disclosure of personal information or the user's identity.

One or more aspects of the exemplary embodiments may include a computer program that embodies the functions described and illustrated herein, wherein the computer program is implemented in a computer system that comprises computer-readable/computer-executable instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as more than one computer may perform the act.

The exemplary systems, methods, and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

The exemplary embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments have been described above in detail, the description is merely for purposes of illustration. It should be appreciated, therefore, that many aspects described above are not intended as required or essential elements unless explicitly stated otherwise. Modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for identifying likely counter-parties for peer-to-peer financial transactions, comprising:
   receiving, by a computer, location data of a user network device associated with a user, the location data indicating a location of the user network device;
   identifying, by the computer, network devices associated with potential financial transaction counter-parties within a configured geographic range of the user network device, each of the potential financial transaction counter-parties being a potential party that is available to conduct a financial transaction with the user;
   searching, by the computer, social network information of the user for occurrences of the potential financial transaction counter-parties;
   ranking, by the computer, the potential financial transaction counter-parties based on a strength of social network connections to the user for each of the potential financial transaction counter-parties;
   determining, by the computer, that a first one of the potential financial transaction counter-parties has made a recent peer-to-peer transaction with a second one of the potential financial transaction counter-parties, wherein the first one of the potential financial transaction counter-parties sent a payment in the recent peer-to-peer transaction and the second one of the potential financial transaction counter-parties received the payment in the recent peer-to-peer transaction;
   promoting, by the computer, the second one of the potential financial transaction counter-parties that received the payment on the ranking of potential financial transaction counter-parties;
   demoting, by the computer, the first one of the potential financial transaction counter-parties that sent the payment on the ranking of potential financial transaction counter-parties; and
   transmitting, by the computer to the user network device, the identified potential financial transaction counter-parties for presentation on the user network device, wherein the potential financial transaction counter-parties are sorted based on the ranking.

2. The computer-implemented method of claim 1, further comprising:
   identifying previous financial transactions between the user and one of the potential financial transaction counter-parties; and
   determining a quantity of the identified financial transactions between the user and the one of the potential financial transaction counter-parties,
   wherein the ranking of the potential financial transaction counter-parties is further based at least in part on the quantity of the identified financial transactions between the user and the one of the potential financial transaction counter-parties.

3. The computer-implemented method of claim 1, wherein the social network information comprises a social graph of the user.

4. The computer-implemented method of claim 3, wherein the social graph comprises information from at least one of a social network site and a contacts application.

5. The computer-implemented method of claim 1, wherein selection of one of the potential financial transaction counter-parties via the user network device associated with the user initiates a transaction between the user network device associated with the user and the network device associated with the selected counter-party.

6. The computer-implemented method of claim 1, wherein ranking of the potential financial transaction counter-parties is based at least in part on a number of occurrences of each respective counter-party in the social network information of the user.

7. The computer-implemented method of claim 1, further comprising:
   determining, by the computer, that one of the potential financial transaction counter-parties has made a recent transaction with a merchant; and
   promoting, by the computer, the one of the potential financial transaction counter-parties that has made a recent transaction with a merchant on the ranking of potential financial transaction counter-parties.

8. A non-transitory computer-readable medium having computer-executable program instructions embodied thereon that when executed by a computer causes the computer to identify likely counter-parties for peer-to-peer financial transactions, the computer-executable program instructions comprising:

computer-executable program instructions to receive location data of a user network device associated with a user, the location data indicating a location of the user network device;

computer-executable program instructions to identify network devices associated with potential financial transaction counter-parties within a configured geographic range of the first user device, each of the potential financial transaction counter-parties being a potential party that is available to conduct a financial transaction with the user;

computer-executable program instructions to search social network information of the user for occurrences of the potential financial transaction counter-parties;

computer-executable program instructions to rank the potential financial transaction counter-parties based on a strength of respective social network connections to the user for each of the potential financial transaction counter-parties computer-executable program instructions to determine that a first one of the potential financial transaction counter-parties has made a recent peer-to-peer transaction with a second one of the potential financial transaction counter-parties, wherein the first one of the potential financial transaction counter-parties sent a payment in the recent peer-to-peer transaction and the second one of the potential financial transaction counter-parties received the payment in the recent peer-to-peer transaction;

computer-executable program instructions to promote the second one of the potential financial transaction counter-parties that received the payment on the ranking of potential financial transaction counter-parties; and computer-executable program instructions to demote the first one of the potential financial transaction counter-parties that sent the payment on the ranking of potential financial transaction counter-parties.

9. The computer-readable medium of claim 8,
wherein the social network information comprises a social graph of the user.

10. The computer-readable medium of claim 9,
wherein the social graph comprises information from at least one of a social network site and a contacts application.

11. The computer-readable medium of claim 8, the computer-executable program instructions further comprising:
computer-executable program instructions to identify previous financial transactions between the user and one of the potential financial transaction counter-parties; and
computer-executable program instructions to determine a quantity of the identified financial transactions between the user and the one of the potential financial transaction counter-parties,
wherein the ranking of the potential financial transaction counter-parties is further based at least in part on the quantity of the identified financial transactions between the user and the one of the potential financial transaction counter-parties.

12. The computer-readable medium of claim 8,
wherein selection of one of the potential financial transaction counter-parties via the user network device associated with the user initiates a financial transaction between the user network device associated with the user and the network device associated with the selected counter-party.

13. The computer-readable medium of claim 8,
wherein the rank of the potential financial transaction counter-parties is based at least in part on a number of occurrences of each respective counter-party in the social network information of the user.

14. The computer-readable medium of claim 8, the computer-readable medium further comprising:
computer-executable program instructions to determine that one of the potential financial transaction counter-parties has made a recent transaction with a merchant; and
computer-executable program instructions to promote the one of the potential financial transaction counter-parties that has made a recent transaction with a merchant on the ranking of potential financial transaction counter-parties.

15. The computer-readable medium of claim 8, the computer-readable medium further comprising
computer-executable program instructions to transmit the identified potential financial transaction counter-parties for presentation on the user network device, wherein the potential financial transaction counter-parties are sorted based on the ranking.

16. A system to identify likely counter-parties for peer-to-peer financial transactions, the system comprising:
a computer executing a first application, the first application configured to:
receive location data of a user network device associated with a user, the location data indicating a location of the user network device;
identify network devices associated with potential financial transaction counter-parties within a configured geographic range of the first user device, each of the potential financial transaction counter-parties being a potential party that is available to conduct a financial transaction with the user;
search social network information of the user for occurrences of the potential financial transaction counter-parties;
rank the potential financial transaction counter-parties based on a strength of social network connections to the user for each of the potential financial transaction counter-parties;
determine that a first one of the potential financial transaction counter-parties has made a recent peer-to-peer transaction with a second one of the potential financial transaction counter-parties, wherein the first one of the potential financial transaction counter-parties sent a payment in the recent peer-to-peer transaction and the second one of the potential financial transaction counter-parties received the payment in the recent peer-to-peer transaction;
promote the second one of the potential financial transaction counter-parties that received the payment on the ranking of potential financial transaction counter-parties;
demote the first one of the potential financial transaction counter-parties that sent the payment on the ranking of potential financial transaction counter-parties; and
communicate the identified potential financial transaction counter-parties to the user network device for presentation on the user network device, the potential financial transaction counter-parties being sorted based on the ranking.

17. The system of claim 16, further comprising a second application executing on a user network device, the second application configured to:

determine the location data from the user network device;

transmit the location data to the computer;

receive the identified potential financial transaction counter-parties for presentation on the user network device, wherein the potential financial transaction counter-parties are sorted based on the ranking; and display the ranked list of potential financial transaction counter-parties on the user network device.

18. The system of claim 16, the first application being further configured to:

identify previous financial transactions between the user and one of the potential financial transaction counter-parties; and determine a quantity of the identified financial transactions between the user and the one of the potential financial transaction counter-parties, wherein the ranking of the potential financial transaction counter-parties is based at least in part on the quantity of the identified financial transactions between the user and the one of the potential financial transaction counter-parties.

19. The system of claim 16, wherein the social network information comprises a social graph of the user.

20. The system of claim 19, wherein the social graph comprises information from at least one of a social network site and a contacts application.

21. The system of claim 16, wherein selection of one of the potential financial transaction counter-parties via the user network device associated with the user initiates a financial transaction between the user network device associated with the user and the network device associated with the selected counter-party.

22. The system of claim 16, the first application being further configured to:

determine that one of the potential financial transaction counter-parties has made a recent transaction with a merchant; and promote the one of the potential financial transaction counter-parties that has made a recent transaction with a merchant on the ranking of potential financial transaction counter-parties.

* * * * *